Dec. 1, 1959 W. GOODRICH 2,914,968
DIE HANDLING AND ASSEMBLY MACHINE
Filed March 18, 1958 3 Sheets-Sheet 1

INVENTOR.
WILLIAM GOODRICH

Dec. 1, 1959  W. GOODRICH  2,914,968
DIE HANDLING AND ASSEMBLY MACHINE
Filed March 18, 1958  3 Sheets-Sheet 2

INVENTOR.
WILLIAM GOODRICH

United States Patent Office 2,914,968
Patented Dec. 1, 1959

2,914,968

DIE HANDLING AND ASSEMBLY MACHINE

William Goodrich, Cleveland, Ohio

Application March 18, 1958, Serial No. 722,178

8 Claims. (Cl. 76—4)

This invention relates to machine or apparatus for handling dies, and more particularly to a die assembling machine adapted to permit two die shoes to be disposed in various positions whereby both the top and bottom surface of each shoe is accessible for light machining and assembly operations, said positions including concurrent disposition of each shoe in a horizontal position at a convenient working height, and the machine being further adapted to try-out co-operating die sections for alignment and inter fit of punch parts and the like with the shoes in either a horizontal or vertical position.

I am aware that it has previously been suggested to provide relatively heavy try-out presses for die shops wherein the top shoe of a die is secured to a vertically movable top platen of the press and the die bottom shoe is secured to a fixed bottom platen of the press. The construction of presses of this type is such that access to the shoes is difficult.

Also I am aware that it has previously been suggested to provide a die handling machine wherein the die bottom shoe is secured to a fixed lower platen and the die top shoe is secured to a top platen which is vertically movable between upstanding columns and is also rotatable about a horizontal axis or is journaled in vertically movable bearings mounted on the columns. In this type machine in order to clear the lower die shoe or at least the lower platen if the lower die shoe is not in place as the top platen and top die shoe is rotated the axis of rotation of the top platen must be maintained relatively high since it is customary to maintain the fixed bottom platen at a convenient level for working on the die bottom shoe. Rotating the top die shoe through 180° so that the die working surface is uppermost disposes this surface at an impractical height for performing operations thereon.

I have developed a die assembling machine overcoming the aforementioned disadvantages which is relatively inexpensive and efficient without special equipment thus making it particularly useful to small volume die shops. According to the invention, I provide supporting legs and a generally rectangular top frame disposed at a convenient working height. The top frame includes side members supporting a pair of longitudinally slidable platens, each adapted to support one of a pair of co-operating die shoes. The machine is preferably provided with wheels whereby it may be moved adjacent a machine tool or the like for light machining operations. Levelling pads support the machine at a desired location. Thus both working faces of the die shoes or sections can be disposed upwardly at a convenient height for light machining and assembly operations. Each platen is rotatable about a transverse horizontal axis to an indexed position including a vertical position whereby the die shoes in vertical position can be moved into engagement for checking alignment, inter-fit of punch parts and the like. Further, the frame can be tilted to a vertical position and the die sections brought together in horizontal position corresponding to the manner in which the sections would normally be mounted in a production press.

It is a primary object of the invention to provide a die assembling machine wherein a pair of co-operating die shoes may be individually moved to a plurality of positions permitting easy access to both surfaces of each shoe for light machining and assembly operations including disposition of both shoes in horizontal position at a convenient working height and also permitting engagement of the sections in either a vertical or horizontal position for checking alignment and inter-fit of parts.

Other objects of the invention and the invention itself will become increasingly apparent from a consideration of the following description and drawings wherein.

Figure 1:
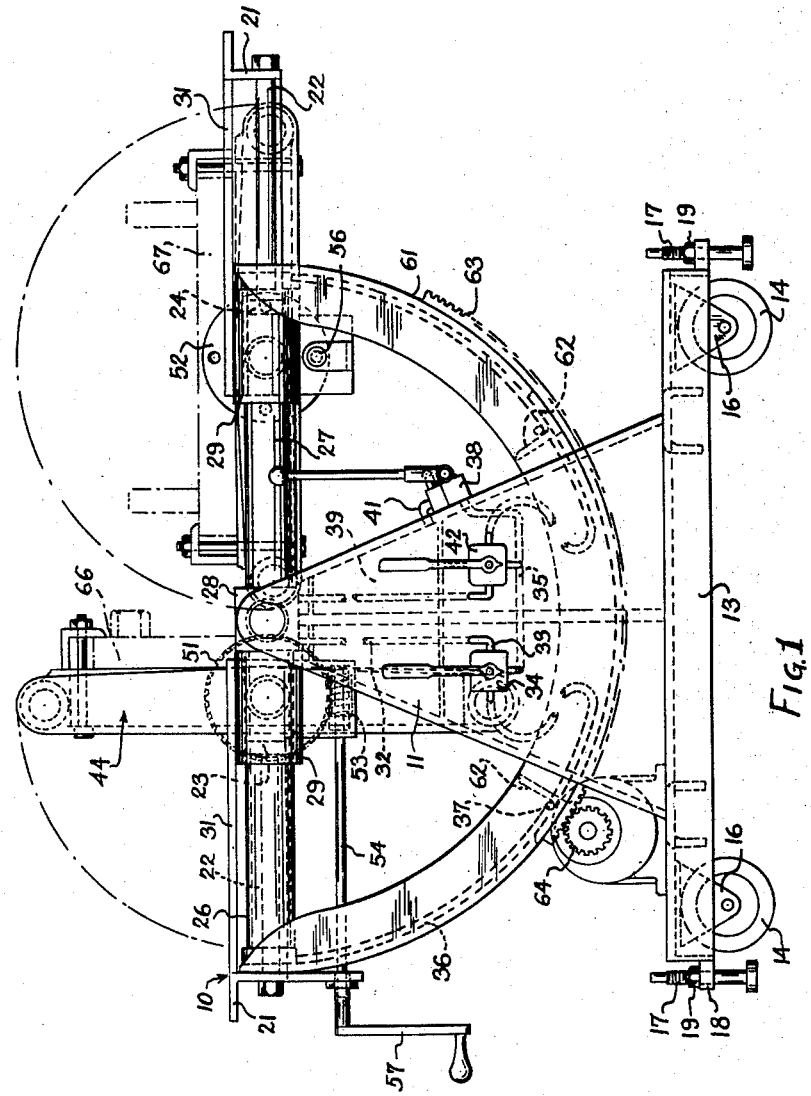
Figure 1 is a side elevational view of a die assembling machine embodying the invention with the top frame in horizontal position.

Referring now to the drawings and particularly Figure 1, I have illustrated the machine as comprising a top frame generally indicated at 10, a pair of side supports 11 and 12, and a generally rectangular bottom frame 13. The machine is movably supported on wheels 14 journaled in brackets 16 secured to the bottom frame. Any suitable type of levelling and support means may be provided whereby at a desired location the machine may be raised and levelled to disengage the wheels from the floor and provide a firm support for the machine. For example, threaded studs 17 extending from the bottom frame and disposed adjacent wheels 14 can engage threads in lugs 18 whereby the studs can be adjusted and locked in position by nuts 19.

The top frame 10 comprises end members 21 of inverted L cross section secured to piston rods 22. Referring to Figure 1, the left hand pair of piston rods are secured to pistons indicated at 23 and the right hand pair to pistons indicated at 24. Pistons 23 are disposed in cylinders 26 and pistons 24 are disposed in cylinders 27. Disposed between the cylinders 26 and 27 at each side of the top frame 10 is a block 28 which supports the cylinders and forms a separate head closure for each cylinder. Slidably telescoped over each cylinder is a sleeve 29 and each sleeve is rigidly connected to its associated end member 21 by an inverted L member 31 preferably by welding. It will now be understood that the top frame includes two longitudinally slidable yokes each comprising an end member 21, a pair of sleeves 29 and a pair of inter-connecting side members 31.

The manner of effecting movement of the yokes will now be described. Communicating with the left hand cylinders 26 through the blocks 28 are a pair of flexible lines 32 which connect at their lower ends with a flexible transverse line 33 which leads to a four-way valve 34. Extending from the stuffing box ends of cylinders 26 are a pair of flexible lines 36 which connect at their lower ends with a transverse flexible line 37 which is connected to four way valve 34. Valve 34 is connected through a line 35 with a pump 38 which connects with an oil reservoir 39 through a line 41. Although the pump is illustrated as manually operable it is understood that a motorized type pump can be used. When valve 34 is moved to one position equal pressure will be applied to both pistons 23 causing the yoke to move in one direction and when the valve is moved to another position the yoke will be caused to move in the opposite direction. The right hand yoke is moved in a similar manner through operation of a second four way valve 42.

Figure 3:
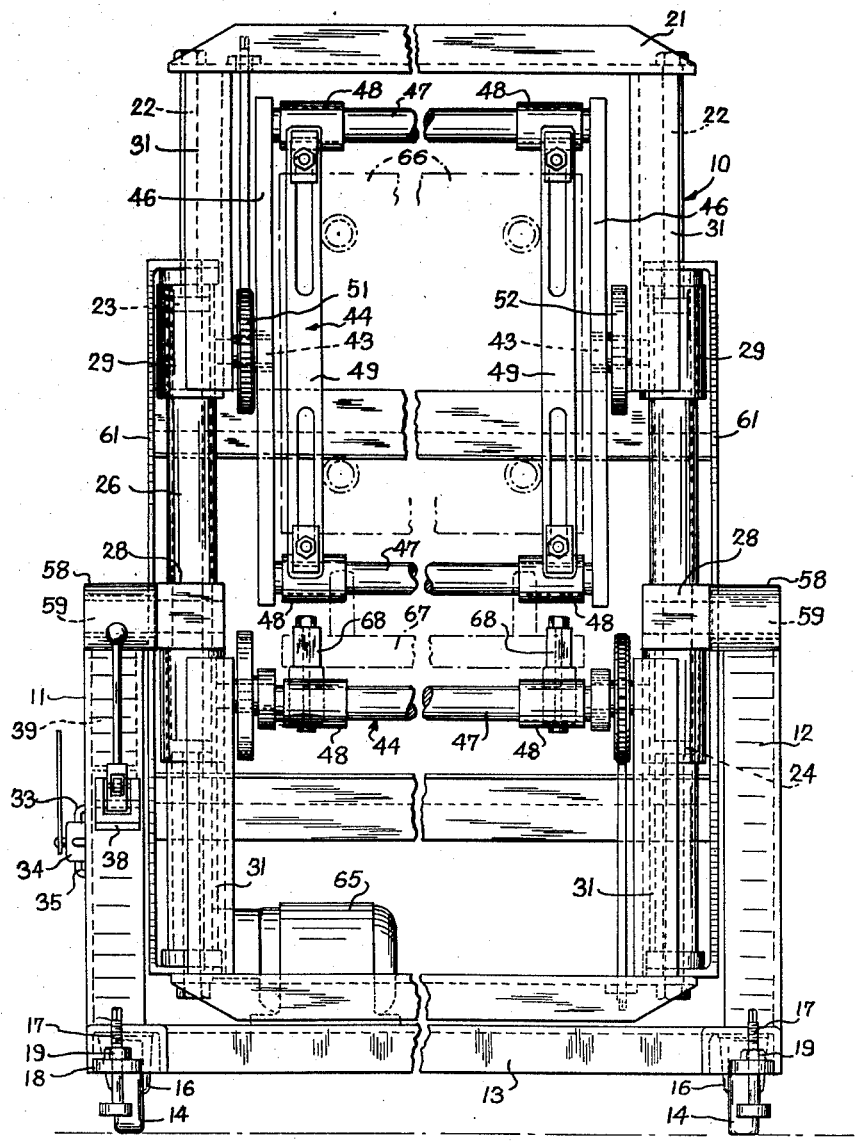
Figure 3 is a front elevational view of the machine with the top frame in vertical position.

As best illustrated in Figure 3 a pair of stub shafts 43 extend from side member 31 which rotatably support platens generally indicated at 44. Each platen comprises a pair of side bars 46 which support cylindrical end bars 47. Telescoped over each end bar are a pair of sleeves 48, sleeves on opposite bars 47 are interconnected by slotted rails 49. One stub shaft 43 has a worm gear 51 rotatable thereon which is fixed to its adjacent side bar 46 and the other stub shaft has a circular index plate 52 rotatable thereon which is fixed to its adjacent side bar 46. Referring to Figure 1, worm gear 51 engages a worm 53 mounted on a hand crank shaft 54 whereby the platen 44 can be rotated to a desired position and locked in said position by an index pin 56 engaging a hole in the index plate. The crank handle 57 is removable and may be used for adjusting levelling studs 17.

Figure 2:
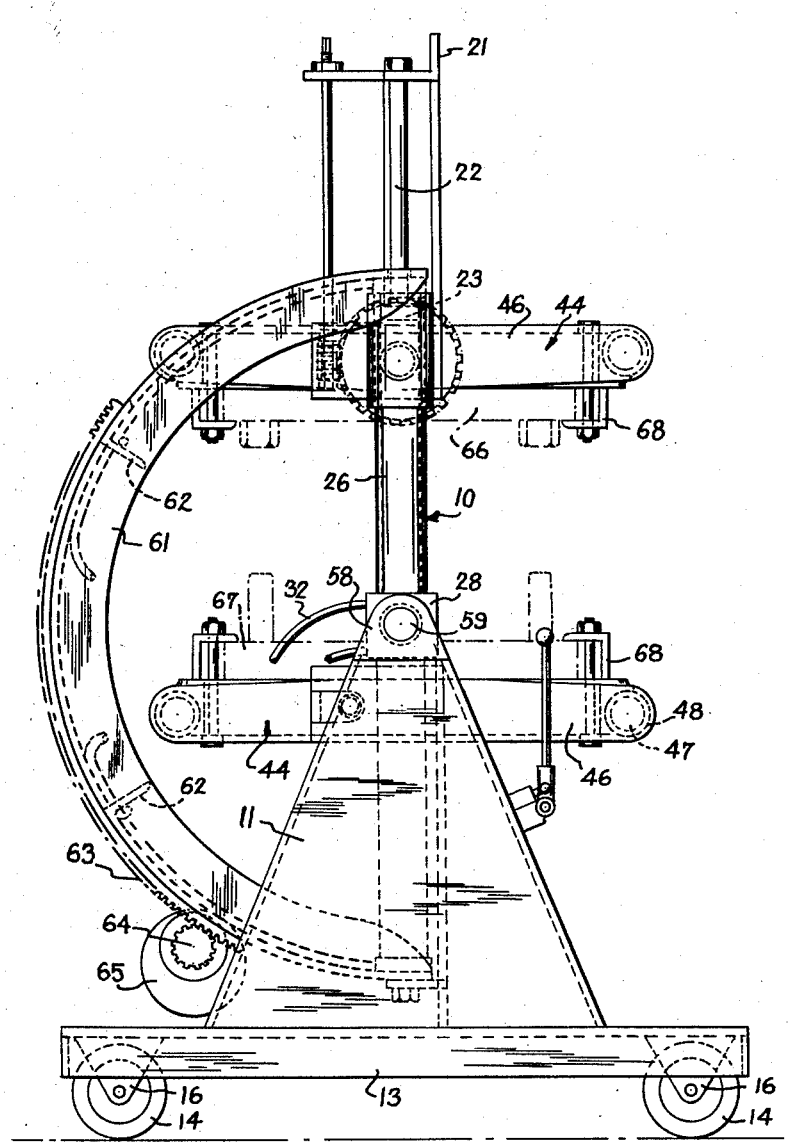
Figure 2 is a view similar to Figure 1 with the top frame in vertical position.

Referring to Figure 1 it will be noted that the frame 10 is in horizontal position and in Figures 2 and 3 it is shown in vertical position. The manner of rotating the top frame will now be described. Mounted at the top of each side support 11 and 12 is a bearing block 58 which rotatably supports a stub shaft 59 fixed to block 28. A cradle is formed with a pair of generally semicircular members 61 each secured at its ends to the cylinders. A pair of transverse angle sections 62 interconnect members 61. One member 61 has an arcuate rack 63 sescured thereto which engages a gear 64 driven through reduction gear by a reversible electric motor 65.

The manner of operating the machine will now be described and it will be assumed the top frame 10 is in vertical position as illustrated in Figure 2. The top shoe of a die set is indicated at 66 and the bottom shoe at 67. The rails 49 are manually adjustable to accommodate die sets of varying width and the shoes are secured in a conventional manner by clamps 68. In practice the guide bushings and leader pins would be engaged when the set is placed in the machine and after clamping the shoes the upper platen and attached upper shoe will be raised to the position shown by operating the hydraulic system. This is a practical position for layout, inspection, checking inter-fit and the like.

Figure 1 illustrates the top frame moved to horizontal position and this effected by energizing motor 66 to move the frame through a 90° arc, preferably controlled by a limit switch (not shown). The platens 44 can then be individually moved to a horizontal position or a vertical position and locked in such position by the index pin 56. Since the platens can be rotated through 360° either the working surface or the back surface of a shoe can be disposed upwardly. Also both shoes of a set can be disposed horizontally at a convenient working height at the same time for light machine and assembly operations which cannot be conveniently done with top frame 10 in vertical position. Further, the open design of the platen makes the back or non-working face of the shoe easily accessible. With the top frame 10 in horizontal position the shoes can be disposed in vertical position with the working surfaces facing and the sections moved into engagement for checking inter-fit of punches and the like.

I wish it to be understood that I do not desire to be limited to the exact details of construction shown and described for obvious modification will occur to persons skilled in the art.

What I claim is as follows:

1. In a machine for handling and assembling dies, a base, a pair of spaced upstanding supports secured to opposite sides of the base, a generally rectangular frame pivotally mounted between the upper ends of the supports to rotate on a transverse horizontal axis, means for rotating the frame about said axis to selectively dispose said frame in a horizontal and vertical position, a pair of platens pivotally supported by the frame and each platen being adapted to have a die shoe secured to one face of the platen, one platen being disposed to rotate about a transverse horizontal axis at one side of the frame axis and the other platen being disposed to rotate about a transverse horizontal axis at the opposite side of the frame axis, means to individually rotate each platen relative to the frame whereby the platens may be selectively disposed in a generally common plane and in generally parallel planes, and means for moving either platen towards any away from the said frame axis.

2. In a machine for handling and assembling dies, a base, upstanding supports secured to the base, a generally rectangular frame mounted at the upper ends of the supports, a pair of platens pivotally mounted on the frame and each adapted to have a die shoe secured thereto, each platen being disposed to rotate about a transverse horizontal axis, means for individually rotating each platen relative to the frame, means for locking each platen in a plurality of relatively rotated positions, said frame comprising a yoke including an end member and spaced side members, said side members being supported for longitudinal movement by co-operating side members whereby the frame may be extended and contracted longitudinally, means for moving said yoke longitudinally of the frame, and the pivotal mounting for platen includes bearings fixed to the yoke side members whereby the platen will be moved longitudinally with the yoke to accommodate die shoes of varying longitudinal extent.

3. The machine for handling and assembling dies as described in claim 2 and wherein each yoke side member comprises a piston and a piston rod secured to the yoke end member and piston, the co-operating side member for each yoke side member includes a piston cylinder, the means for moving the yoke comprises a hydraulic system including a pump, conduit means extending from the pump to each side of the pistons, and control valve means in the conduit means, and sleeves slidable on the cylinders and secured to the yoke end member form a mounting for the bearings supporting the platen.

4. The machine for handling and assembling dies as described in claim 2 and wherein the frame includes a yoke at each end portion, and means are provided for individually moving each yoke and its associated platen.

5. The machine for handling and assembling dies as described in claim 1 and wherein the means for rotating the frame comprises a pair of semi-circular members secured one to each side of the frame and co-axially with the frame, a curved gear rack secured to at least one of said members, a driving pinion engaging said rack, and a reversible electric motor adapted to drive said pinion through reduction gearing.

6. In a machine for handling and assembling dies, a base, a pair of upstanding supports secured to opposite sides of the base, a bearing at the upper end of each support, a block rotatably supported by each bearing, a pair of longitudinally aligned cylinders supported by the block and extending in opposite directions therefrom, a piston in each cylinder having a rod extending outwardly from the cylinder, an end member secured to the outer end of each pair of piston rods extending in the same direction, said blocks, cylinders, rods and end members forming a generally rectangular frame rotatable about a horizontal transverse axis, a sleeve slidably telescoped over each cylinder, a bearing secured to each sleeve, a pair of platens each adapted to have a die shoe secured thereto disposed one at each side of the frame axis, each platen being supported by a pair of sleeve bearings to rotate about a transverse horizontal axis, means inter-connecting each end member and its associated pair of sleeves, and hydraulic means to move a pair of pistons at either side of the frame axis in either longitudinal direction whereby the portion of the frame at said side may be changed in length and the platen concurrently moved along the frame.

7. The machine for handling and assembling dies as described in claim 6 and wherein the base is provided with wheels and levelling pads whereby the machine can be rolled to a desired location and supported on the levelling pads, and the machine has a self-contained hydraulic system for operating the pistons including a hydraulic fluid reservoir, a pump, valve means and conduit means.

8. The machine for handling and assembling dies as described in claim 6 and wherein each platen comprises a pair of spaced side bars rotatably supported by the sleeve bearings, a pair of end rods supported by the side bars, and a pair of slotted rails slidable transversely on the end rods for adjustment to a die shoe whereby a relatively unimpeded working and inspection space is provided both above and beneath a die shoe secured to the platen.

References Cited in the file of this patent
UNITED STATES PATENTS

| | | |
|---|---|---|
| 2,555,313 | Bowman | June 5, 1951 |
| 2,623,413 | Moore | Dec. 30, 1952 |